UNITED STATES PATENT OFFICE.

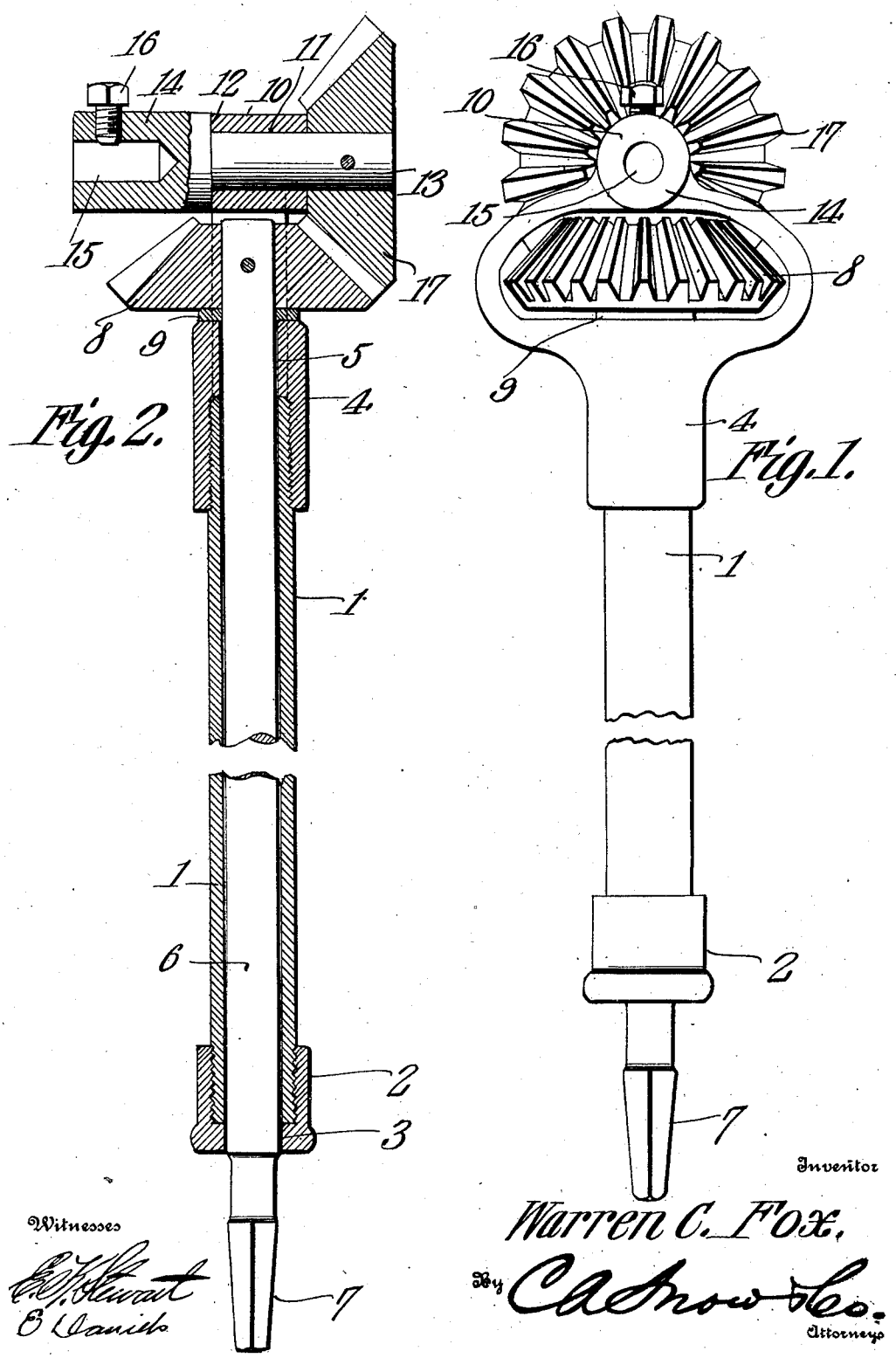

WARREN C. FOX, OF KANSAS CITY, MISSOURI.

BIT-HOLDER.

972,179.  Specification of Letters Patent.  Patented Oct. 11, 1910.

Application filed April 6, 1909. Serial No. 488,289.

*To all whom it may concern:*

Be it known that I, WARREN C. FOX, a citizen of the United States, residing at Kansas City, in the county of Jackson and State of Missouri, have invented a new and useful Bit-Holder, of which the following is a specification.

This invention has relation to bit holders and it consists in the novel construction and arrangement of its parts, as hereinafter shown and described.

The object of the invention is to provide a simple and durable holder of the character indicated, the parts of which are so arranged that the bit is caused to rotate upon an axis extending at an angle to the axis of rotation of the primary actuating part of the device. To accomplish this object the holder in structure comprises a sleeve with bearings at its opposite ends, and in which bearings is journaled a primary shaft. A beveled pinion is fixed to the inner end of the said shaft and a bracket is mounted upon the sleeve and is provided with a head portion having journaled and thrust bearings. A secondary shaft is journaled in the said head portion of the bracket and is provided with an enlarged end portion having a socket for the reception of the shank of the bit and which bears against the thrust bearing of the said head. A beveled pinion is fixed to the end of the secondary shaft opposite the end thereof having the enlarged portion, and the last said beveled pinion meshes with the first said beveled pinion. Thus it will be seen that a compact arrangement of the parts is presented, and that the thrust strain incident to presenting the bit to its work is not transmitted to the intermeshing pinions with the effect of causing one pinion to crowd the other pinion.

The holder is especially designed to be used where it is desired to bore holes in corners or other places where the surrounding space is not sufficient to permit the use of braces of ordinary construction, or bit-holders in which the axis of rotation of the bit is in alinement with the axis of rotation of the primary actuating part.

In the accompanying drawing;—Figure 1 is a side elevation of the bit-holder with parts broken away. Fig. 2 is a vertical sectional view of the same.

The bit-holder includes a sleeve 1, to one end of which is attached a collar 2 having a relatively small bearing 3. At the opposite end of the sleeve 1 is attached a collar 4 having a relatively large or long bearing 5. A primary shaft 6 is journaled at its end portions in the bearings 3 and 4 and traverses the length of the sleeve 1 and projects at its end portions beyond the ends of the collars mounted upon the sleeve. The end portion of the primary shaft 6 which projects beyond the end of the collar 2 is non-circular, as at 7, and is adapted to enter the eye of a wrench or crank handle, or any other means whereby the said shaft 6 may be rotated. At the opposite end of the shaft 6 is fixed a beveled pinion 8, a washer 9 being interposed between the face of the said pinion and the end of the collar 4. The outer portion of the collar 4 is extended into a bracket 9, the arms of which pass diametrically around the opposite sides of the pinion 8, and at the outer portion of the said bracket 9 forms a head 10, which is in alinement with the axis of the shaft 6. The said head 10 is provided with a journal bearing 11 and a thrust bearing 12. A secondary shaft 13 is journaled in the bearing 11 of the head 10 and is provided at one end with an enlargement 14, which, in turn, is provided with a socket 15, and which bears at its inner end against the thrust bearing 12 of the head 10. A set screw 16 is screw-threaded in the enlarged portion 14 of the secondary shaft 13, and at its inner end is adapted to project into the socket 15 provided at the outer end of the enlarged portion 14 of the said shaft. A beveled pinion 17 is fixed to that end of the secondary shaft 13 opposite the end thereof at which the enlarged portion 14 is located, and the said beveled pinion 17 meshes with the beveled pinion 8.

The socket 15 is adapted to receive the shank of a bit (not shown) and when the said bit-shank is inserted in the said socket the set screw 16 is advanced through the enlarged portion 14, so that the inner end of the said screw impinges the bit-shank and holds the same in proper position in the socket 15. When the bit has been attached to the holder as indicated, the sleeve 1 may be held in one hand of an operator, while, with his other hand he may rotate the primary shaft 6 through the instrumentality of a wrench or crank applied to the non-circular end as above indicated. As the said shaft 6 is rotated rotary movement is transmitted through the beveled pinion 8 and beveled pinion 17 to the secondary shaft 13, and thus the said secondary shaft, together with the bit carried thereby, is rotated. As the said bit is presented to its work the thrust strain is transmitted through the head portion 14 of the shaft 13 to the thrust bearing 12 of the head 10 upon the bracket 9, and inasmuch as the beveled pinion 17 is located at the opposite side of the beveled pinion 8 from that over which the enlarged portion 14 of the shaft 13 is located, the said pinion 17 is not crowded toward the pinion 8 as the bit is presented to its work, and consequently there is no tendency to bind the pinions 17 and 8 together, and thereby increase the friction incident to operating the holder.

Having described my invention, what I claim as new, and desire to secure, by Letters Patent, is:—

A bit holder comprising a sleeve, a bracket attached to the sleeve and having a head provided with a journal bearing and a thrust bearing, a primary shaft journaled in the sleeve, a beveled pinion located in the bracket and fixed to said shaft, a secondary shaft journaled in the journal bearing of said head and having an enlarged end portion bearing against the thrust bearing of the head, a beveled pinion fixed to the secondary shaft and having its teeth at that side nearest the enlarged end of the secondary shaft, the pinion upon the secondary shaft meshing with the pinion upon the primary shaft and being free to move away from the axis of the primary shaft when the secondary shaft moves axially as a result of thrust strain in the direction of the pinion located thereon.

In testimony that I claim the foregoing as my own, I have hereto affixed my signature in the presence of two witnesses.

WARREN C. FOX.

Witnesses:
 DAVID O. KINSELY,
 FRANK S. SHIPLEY.